UNITED STATES PATENT OFFICE.

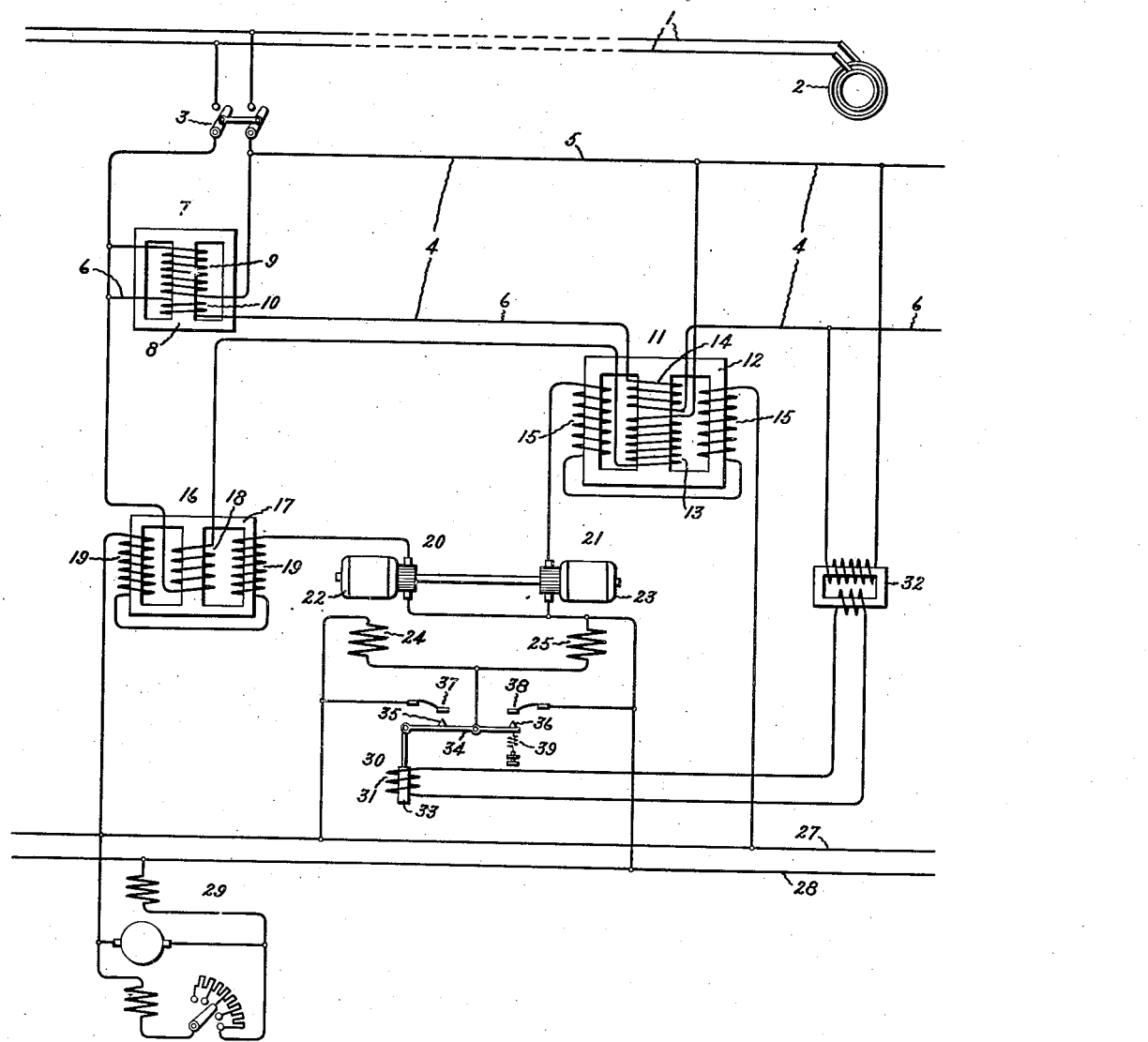

LOUIS W. THOMPSON, OF SCHENECTADY, NEW YORK, ASSIGNOR TO GENERAL ELECTRIC COMPANY, A CORPORATION OF NEW YORK.

REGULATING SYSTEM FOR ALTERNATING-CURRENT CIRCUITS.

1,337,855.      Specification of Letters Patent.      Patented Apr. 20, 1920.

Application filed July 10, 1918. Serial No. 244,171.

*To all whom it may concern:*

Be it known that I, LOUIS W. THOMPSON, a citizen of the United States, residing at Schenectady, county of Schenectady, State of New York, have invented certain new and useful Improvements in Regulating Systems for Alternating-Current Circuits, of which the following is a specification.

My invention relates to regulating systems for alternating current circuits and has for its object the provision of a new and improved regulating system whereby regulation of an electrical condition of an alternating current circuit may be accomplished without the interruption of power currents and without the use of heavy moving parts, and whereby quick and sensitive regulation may be obtained.

In the co-pending joint application, Serial No. 244,164, filed July 10, 1918, by Edwin J. Murphy and Louis W. Thompson, is shown a regulating system for alternating current circuits in which is employed a boosting transformer and a bucking transformer having their secondary windings connected in series with the alternating current circuit which is to be regulated, and their primary windings connected in series across said alternating current circuit, magnetizing windings for developing in said transformers unidirectional fluxes, and means responsive to an electrical condition of said circuit for varying the fluxes in said transformers. With the primary windings of the boosting and bucking transformers connected in series, there may be developed therein under certain conditions voltages which are higher than desired. It is not feasible, however, to connect the primary of each transformer directly across the alternating current circuit, because, if this were done, the impedance in the circuit of the primary winding would be so low when the transformer is saturated by means of the magnetizing windings that the primary winding would constitute practically a short circuit. It is the purpose of the present invention to prevent excessive voltages and excessive currents in the primary windings of the transformers employed in a regulating system of the kind referred to, and to this end I propose to regulate an electrical condition, such as the voltage of an alternating current circuit by means of a regulating system comprising a transformer provided with a secondary winding, connected to modify the voltage of said circuit, a primary winding, connected through a reactor to a suitable source of alternating current, and with means for developing within itself a flux having a lower frequency than the frequency of said circuit, and means responsive to an electrical condition of said circuit for regulating said flux. I also preferably provide the reactor with means for developing in the core thereof a flux having a lower frequency than the frequency of said circuit, and means responsive to an electrical condition of said circuit for varying said flux. While it is preferable to regulate the operation of the transformer and of the reactor by developing in the cores thereof regulatable unidirectional flux, nevertheless the desired operation of the transformer and of the reactor may in a measure be accomplished by developing in the cores regulatable alternating flux having a lower frequency than the frequency of the alternating current circuit to be regulated. Since unidirectional flux and unidirectional current may be properly considered as flux and current of zero frequency, the expression "flux having a lower frequency than the frequency of said circuit" as used herein is intended to include a unidirectional flux as well as an alternating flux, while the expression "current having a lower frequency than the frequency of said circuit" is intended to include unidirectional current as well as an alternating current. The transformer may be connected either so as to boost or so as to buck the voltage in the circuit, or a plurality of transformers may be connected so that the range of regulation includes both boosting and bucking.

My invention may best be understood by reference to the following description considered in connection with the accompanying drawings, while the scope of my invention is defined in the appended claims.

Referring to the accompanying drawings consisting of a single figure, in which is diagrammatically shown one modification of my invention as applied to the regulation of a single-phase alternating current consumption circuit, 1 denotes an alternating current supply circuit which is energized from a single-phase source of current 2 which may be connected by means of the switch 3 to a consumption circuit 4 comprising mains 5 and 6. 7 denotes a boosting transformer having a core 8, a primary winding 9 connected across the mains 5—6 and a secondary winding 10 connected in series with the main 6. 11 denotes a bucking transformer comprising a core 12, a primary winding 13, a secondary winding 14 connected in series with the main 6, and a magnetizing winding 15. 16 denotes a reactor comprising a core 17, a winding 18 connected in series with the primary winding 13 of the transformer 11 across the mains 5—6 and a magnetizing winding 19. The magnetizing winding 15, which is arranged on core 12 of the transformer 11, and the magnetizing winding 19, which is arranged on core 17 of reactor 16, are each disposed so that the voltages induced therein by the alternating fluxes in the cores are substantially neutralized. As illustrated, this neutralization is accomplished by arranging equal portions of the winding 15 and of the winding 19 oppositely with respect to the alternating flux, although numerous other ways of accomplishing this result will be obvious to those skilled in the art. 20 and 21 denote counter electromotive force machines comprising armatures 22 and 23, which are preferably mounted upon a common shaft, and field windings 24 and 25. The magnetizing windings 15 of the transformer 11 are connected in series with the armature 23 across the buses 27 and 28, which may be supplied with current from a direct current generator 29 or any other suitable source of current having lower frequency than the frequency of circuit 4. Similarly the magnetizing windings 19 of the reactor 16 are connected in series with the armature 22 across the buses 27 and 28. 30 denotes a vibratory device comprising an operating winding 31, connected by means of a potential transformer 32 to the consumption circuit 4, a core 33 actuated by said winding 31, a movable arm 34 pivotally connected to said core, contacts 35 and 36 carried by said arm, and resiliently supported contacts 37 and 38 coöperating with the contacts 35 and 36. The field windings 24 and 25 are connected in series across the buses 27 and 28. The contacts 35 and 36 are electrically connected by means of the arm 34 to a point intermediate with the field windings 24 and 25. The contacts 37 and 38 are connected to the buses 27 and 28, respectively. An adjustable spring 39 may be employed in connection with the arm 34 to adjust the operation of the vibratory device 30. The boosting transformer 7 and the bucking transformer 11 are designed and constructed to have sufficient boosting and bucking capacity to accomplish the desired regulation of the circuit 4 over the normal range of load thereon, that is, if the maximum boost required is ten per cent. and the maximum buck required is ten per cent. the boosting transformer 7 will be constructed to give ten per cent. boosting and the bucking transformer 11 will be constructed to give twenty per cent. bucking. This difference in the capacity of two transformers is due to the fact that the boosting transformer is effective at all times. It will, of course, be understood that by proper arrangement of the windings the transformer 7 may be employed as a bucking transformer and the transformer 11 as a boosting transformer. The vibratory device 30 may be adjusted by means of the adjustable spring 39 so that upon the voltage of the alternating current circuit 4 increasing above a desired predetermined value, the core 33 will be raised, thereby engaging the contacts 35 and 37 and disengaging the contacts 36 and 38, and, upon the voltage of the circuit 4 decreasing below said desired predetermined value, the core 33 will be lowered, thereby disengaging the contacts 35 and 37 and engaging contacts 36 and 38.

The operation of my invention, as at present understood, is as follows:

Assume the circuit 1 to be energized, the switch 3 to be closed and direct current buses 27 and 28 to be energized from the generator 29. First supposing the voltage of the consumption circuit to be above the desired predetermined value, the core 33 will be in its upper position so that the contacts 35 and 37 will be engaged and the contacts 36 and 38 will be disengaged. The field winding 24 will then be short circuited by contacts 35 and 37 and, therefore, practically deënergized and the field winding 25 will be energized. The counter electromotive force machine 21 will, therefore, operate as a motor and both armatures 22 and 23 will be rotated. In the armature 22 there will be developed very little, if any, counter electromotive force, so that the current in the magnetizing windings 19 of the reactor 16 will have a relatively high value while in the armature 23 there will be developed a counter electromotive force which will limit the current in the magnetizing windings 15 of the transformer 11 to a relatively low value.

Under these conditions the secondary winding 14 of the transformer 11 will exert substantially its full bucking effect upon the circuit 4 because with a low current in the winding 15 thereof the mutual induction between the windings 13 and 14 will be high and with a high current in the winding 19 of the reactor 16 the reactance developed in the circuit of the primary winding 13 of the transformer 11 by the reactor 16 will be low.

Now supposing the voltage of the consumption circuit 4 to be below the desired predetermined value, the core 33 will be in its lower position and the contacts 35 and 37 be disengaged and the contacts 36 and 38 be engaged. The field winding 24 will then be energized, while the field winding 25 will be short circuited at the contacts 36 and 38 and hence be practically deënergized. The counter electromotive force machine 20 will, therefore, operate as a motor and both armatures 20 and 21 will be rotated. In the armature 22 there will be developed a counter electromotive force which will limit the current in the magnetizing winding 19 of the reactor 16 to a relatively low value while in the armature 23 there will be developed very little, if any, counter electromotive force so that the current in the magnetizing windings 15 of the transformer 11 will have a relatively high value. Under these conditions, the secondary winding 14 of the transformer 11 will exert substantially no bucking effect upon the circuit 4 because with a high current in the winding 15 thereof the mutual induction between the windings 13 and 14 will be low. The current in the primary winding 13, however, will be limited to the desired extent since the reactor 16 will develop a relatively high reactance in the circuit thereof by reason of the fact that the current in the winding 19 of the reactor 16 has a relatively low value.

Although the action of the system when the voltage of the circuit 4 is above or below the desired predetermined value has been described it will be understood that the vibratory device 30 will normally be in rapid vibration, and, through the regulation of the energization of the field windings 24 and 25 of the counter electromotive force machines 20 and 21, will cause the current in the magnetizing windings 15 and 19 of the transformer 11 and the reactor 16 to vary in such a manner as to maintain the voltage of the circuit 4 substantially constant and to prevent excessive current in the primary winding 13 of the transformer 11. The vibratory device 30 is designed and adjusted so that it is very sensitive to the conditions in the circuit 4 and will, therefore, have a high rate of vibration. The counter electromotive force machines 20 and 21, which are interposed between the vibratory device 30 and the magnetizing winding 15 of transformer 11 in the magnetizing winding 19 of the reactor 16, will prevent abrupt variations in the currents therein corresponding to the individual vibrations of the vibratory device 30, but will regulate the currents in said winding in accordance with the average effect of consecutive vibrations of the vibratory device. Since the vibratory device 30 is very sensitive to conditions in the circuit 4 the regulation of the circuit 4 will be sensitive and quick notwithstanding the interposition of the counter electromotive force machines 20 and 21 between the vibratory device 30 and the windings 15 and 19. Although the arrangement in which a counter electromotive force machine is interposed between a vibratory device and a regulating transformer is at present considered the preferred arrangement, nevertheless it will be understood that the vibratory device 30 may be made to control the currents in the windings 15 and 19 through intermediate apparatus, other than counter electromotive force machines, which will likewise be effective to prevent objectionable fluctuations in the voltage of the circuit 4 due to the action of the vibratory device.

Although my invention is illustrated as applied to a single-phase alternating current circuit, it will be apparent to those skilled in the art how it may be applied to polyphase alternating current circuits.

While I have herein shown and described one modification of my invention, I do not desire to be limited to the exact arrangement shown and described but seek to cover in the appended claims all those modifications which come within the true spirit and scope of my invention.

What I claim as new and desire to secure by Letters Patent of the United States, is:

1. The combination with an alternating current circuit of means for regulating an electrical condition thereof comprising a transformer having a secondary winding, connected in said circuit, and a primary winding, a reactor having a winding connected in series with said primary winding, means for producing in said transformer a flux having a lower frequency than the frequency of said circuit, and means responsive to an electrical condition of said circuit for varying said flux and the inductance of said reactor.

2. The combination with an alternating current circuit of means for regulating an electrical condition thereof comprising a transformer having a secondary winding, connected in said circuit, and a primary winding, a reactor having a winding connected in series with said primary winding, means for producing in said transformer and said reactor fluxes having lower frequencies than the frequency of said circuit and means responsive to an electrical condition of said circuit for varying said fluxes.

3. The combination with an alternating current circuit of means for regulating an electrical condition thereof comprising a transformer having a secondary winding, connected in series with said circuit, and a primary winding, a reactor having a winding connected in series with said primary winding across said circuit, means for producing in said transformer and said reactor fluxes having lower frequencies than the frequency of said circuit, and means responsive to an electrical condition of said circuit for regulating said fluxes.

4. The combination with an alternating current circuit of means for regulating an electrical condition thereof comprising a transformer having a secondary winding, connected in series with said circuit, a primary winding, and a magnetizing winding, a reactor having a winding, connected in series with said primary winding across said circuit, and a magnetizing winding, means for supplying currents having lower frequencies than the frequency of said circuit to said magnetizing windings, and means for regulating the relative values of the currents in said magnetizing windings.

5. The combination with an alternating current circuit of means for regulating an electrical condition thereof comprising transforming means having a secondary winding, connected in series with said circuit, a primary winding and a magnetizing winding, a reactor having a winding, connected in series with said primary winding, and a magnetizing winding, the magnetizing windings of said transforming means and said reactor being arranged so that substantially no induced currents are caused to flow therein, means for supplying currents having lower frequencies than the frequency of said circuit to said magnetizing windings, and means responsive to an electrical condition of said circuit for varying the currents in said magnetizing windings.

6. The combination with an alternating current circuit of means for regulating an electrical condition thereof comprising transforming means having secondary windings, connected in series with said circuit, primary windings, and magnetizing windings, said magnetizing windings being substantially non-inductively arranged with respect to said secondary and primary windings, reactance means having windings connected in series with said primary windings and magnetizing windings, the magnetizing windings of said reactance means being substantially non-inductively arranged with respect to the other windings of the reactance means, means for supplying currents having lower frequencies than the frequency of said circuit to said magnetizing windings, and means responsive to an electrical condition of said circuit for regulating the currents in said magnetizing windings.

7. The combination with an alternating current circuit of means for regulating an electrical condition thereof comprising a boosting transformer and a bucking transformer, one of said transformers having a secondary winding, connected in said circuit, and a primary winding, a reactor having a winding connected in series with said primary winding, means for producing magnetic flux in said transformer having lower frequency than the frequency of said circuit and means responsive to an electrical condition of said circuit for varying said flux.

8. The combination with alternating current mains of means for regulating an electrical condition thereof comprising a boosting transformer and a bucking transformer, one of said transformers having a secondary winding, connected in series with said circuit, and a primary winding, a reactor having a winding, connected in series with said primary winding across said circuit, means for producing magnetic fluxes in said transformer and said reactor having lower frequency than the frequency of said circuit, and means responsive to an electrical condition of said circuit for regulating said fluxes.

9. The combination with an alternating current circuit of means for regulating an electrical condition thereof comprising transforming means having a secondary winding, connected in series with said circuit, a primary winding, and a magnetizing winding, a reactor having a winding, connected in series with said primary winding, and a magnetizing winding, the magnetizing windings of said transforming means and said reactor being arranged so that substantially no induced currents are caused to flow therein, means for supplying currents having lower frequencies than the frequency of said circuit to said magnetizing windings, and means for controlling the relative values of the currents in said magnetizing windings comprising a counter electro-motive force machine having a field winding and vibratory means responsive to an electrical condition of said circuit for varying the energization of said winding.

10. The combination with an alternating current circuit of means for regulating an electrical condition thereof comprising boosting transforming means and bucking transforming means, one of said transforming means having a secondary winding, connected in series with said circuit, a primary winding and a magnetizing winding, a reactor having a winding, connected in series with said primary winding, and a magnetizing winding, the magnetizing windings of said transforming means and said reactor being arranged so that substantially no induced currents are caused to flow therein, means for supplying unidirectional currents to said magnetizing windings, and means for controlling the relative values of the currents in said magnetizing windings comprising counter electromotive force machines having armatures, connected in series with said magnetizing windings, and field windings, and vibratory means responsive to an electrical condition of said circuit for varying the energization of said field windings.

In witness whereof, I have hereunto set my hand this 8th day of July, 1918.

LOUIS W. THOMPSON.